(12) United States Patent
Kim

(10) Patent No.: US 10,582,569 B2
(45) Date of Patent: Mar. 3, 2020

(54) WIFI NETWORK SYSTEM FOR HIGHLY DENSE NETWORK ENVIRONMENT

(71) Applicants: WITHUSPLANET INC., Anyang-si, Gyeonggi-do (KR); Young Jae Kim, Anyang-si (KR)

(72) Inventor: Young Jae Kim, Anyang-si (KR)

(73) Assignees: WITHUSPLANET INC., Anyang-si (KR); Young Jae Kim, Anyang-si (KR)

( * ) Notice: Subject to any disclaimer, the term of this patent is extended or adjusted under 35 U.S.C. 154(b) by 0 days.

(21) Appl. No.: 16/314,228

(22) PCT Filed: Jul. 23, 2018

(86) PCT No.: PCT/KR2018/008279
§ 371 (c)(1),
(2) Date: Dec. 28, 2018

(87) PCT Pub. No.: WO2019/235684
PCT Pub. Date: Dec. 12, 2019

(65) Prior Publication Data
US 2019/0373674 A1    Dec. 5, 2019

(30) Foreign Application Priority Data

Jun. 4, 2018    (KR) .................... 10-2018-0064454

(51) Int. Cl.
*H04B 1/38* (2015.01)
*H04W 88/08* (2009.01)
(Continued)

(52) U.S. Cl.
CPC ........ *H04W 88/085* (2013.01); *H04B 1/0039* (2013.01); *H04B 1/16* (2013.01); *H04B 1/40* (2013.01)

(58) Field of Classification Search
CPC ..... H04W 88/085; H04B 1/16; H04B 1/0039; H04B 1/40
(Continued)

(56) References Cited

U.S. PATENT DOCUMENTS

2011/0243291 A1* 10/2011 McAllister ............ H04J 3/0658
375/376
2018/0109998 A1*  4/2018 Ringland .............. H04W 48/18

FOREIGN PATENT DOCUMENTS

KR           101034931 B1 *  5/2011
KR       10-2017-0029584 A    3/2017
KR         10-1759296 B1      7/2017

OTHER PUBLICATIONS

Rohan Murty et al., "Designing High Performance Enterprise Wi-Fi Networks", NSDI '08 5th USENIX Symposium on Networked Systems Design and Implementation, Apr. 16, 2008, pp. 73-88.
(Continued)

*Primary Examiner* — Amancio Gonzalez
(74) *Attorney, Agent, or Firm* — Sughrue Mion, PLLC

(57) ABSTRACT

The present invention relates to a WiFi network system. More specifically, a digital network & control unit (DNCU) which is a digital network controller in one WiFi access point (AP) and a WiFi radio unit (wRU) which is a radio signal transmitter are separated from each other, and common DNCUs in each WiFi AP are placed in an operating station. Thus, the common DNCUs are concentrated on one place and managed. In addition, since only the wRU is placed in outdoor and indoor WiFi service areas in which radio signals are actually transceived, the product price and the network investment cost and management cost can be reduced. To this end, a digital networking & control unit (DNCU) which includes a digital controller and a network processing unit and a WiFi radio service unit (wRSU) which
(Continued)

includes a WiFi radio and an antenna unit are independently separated from each other and are connected to each other by a cable.

12 Claims, 5 Drawing Sheets

(51) Int. Cl.
*H04B 1/00* (2006.01)
*H04B 1/40* (2015.01)
*H04B 1/16* (2006.01)

(58) Field of Classification Search
USPC .......................................................... 455/561
See application file for complete search history.

(56) References Cited

OTHER PUBLICATIONS

Cisco, Real-Time Traffic over Wireless LAN Solution Reference Network, Nov. 11, 2013, pp. 1-128.

* cited by examiner

WIFI NETWORK SYSTEM FOR HIGHLY DENSE NETWORK ENVIRONMENT

CROSS REFERENCE TO RELATED APPLICATIONS

This application is a National Stage of International Application No. PCT/KR2018/008279 filed Jul. 23, 2018, claiming priority based on Korean Patent Application No. 10-2018-0064454 filed Jun. 4, 2018.

TECHNICAL FIELD

The present invention relates to a WiFi network system. More specifically, a digital network & control unit (DNCU) which is a digital network controller in one WiFi access point (AP) and a WiFi radio unit (wRU) which is a radio signal transmitter are separated from each other, and common DNCUs in each WiFi AP are placed in an operating station. Thus, the common DNCUs are concentrated on one place and managed. In addition, since only the wRU is placed in outdoor and indoor WiFi service areas in which radio signals are actually transceived, the product price and the network investment cost and management cost can be reduced. The present invention relates to a WiFi service device and a network system for an highly dense network environment, capable of reducing the communication cost burden and enabling high-speed and high-quality radio communication.

BACKGROUND ART

Generally, WiFi-based wireless Internet services facilitate access to information at low cost with respect to information have-nots or in public places. In terms of operators, outdoor services of WiFi devices are gradually increased, but the current WiFi AP has a structure that is not easy in radio site expansion and installation as illustrated in FIG. 1.

1) The current WiFi device has an integrated structure in which a data processing unit (DNCU) and a radio transceiver unit (wRL) are installed together at a cell site.

2) The current WiFi device is mainly installed in indoor and in-house spaces of medium- and large-sized buildings for stable power supply and cooling.

Due to the introduction of high-capacity data processing and MIMO technology, the WiFi APs are increasing in size and power consumption. The places where such WiFi APs are installed are gradually expanding from indoor to outdoor.

Recently, public WiFi has increased so as to reduce a highly dense network environment and communication cost burden. WiFi devices are increasingly installed outdoors. In addition, since WiFi AP requires MIMO technology for high-capacity data transmission and high-performance CPU for high-speed processing of high-capacity data, the size of the WiFi AP increases and power consumption continues to increase.

Upon outdoor installation of WiFi APs whose size and power consumption are increasing, dedicated base stations (or housings), power facilities, cooling facilities, and the like should be installed for each WiFi base station. In the indoor space, a wider installation space is required than the conventional one. In addition, the installation cost and the construction time burned due to the increase in the installation equipment and facilities in the outdoor installation are increasing. Therefore, the user's electricity cost is also increased every month.

Consequently, in order to provide a 5G service at low cost by using WiFi AP, CAPEX/OPEX costs for public WiFi, WiFi To The Home services, and fixed radio communications will increase. As WiFi radio networks gradually evolve and expand, the cell size is gradually smaller, and thus it is necessary to build and operate more cell sites. Since this leads to an increase in facility investment, it is a big problem for Internet service providers.

These technological developments have recently reached the level of defining the WiFi outdoor services for the first time in the WiFi standard IEEE 802.311ax. Therefore, there is a need to propose a novel WiFi structure that can provide high-capacity and low-latency services which meet the 4th industrial revolution and 5G era and provide WiFi services at low cost.

In the fourth industrial revolution era implemented with 5G, there is a need to propose a WiFi AP technology having a novel structure, which replaces a part of optical cable section with a wireless section through gradual commercialization of fixed radio communication services so as to supply ultra-high-speed giga Internet at low cost in more homes, offices and public places.

SUMMARY

The present invention has been made in an effort to solve the problems of the related art, and provides a WiFi network system for a highly dense network environment, in which a DNCU (including a host CPU) and a wRU integrated in a WiFi AP device are separated from each other, and common DNCUs in each WiFi AP are concentrated on an operating station and managed, and only the wRU is placed in outdoor and indoor WiFi service areas, thereby reducing the communication cost burden and enabling ultra-high-speed and high-quality radio communication.

In order to achieve the object, a digital networking & control unit (DNCU) which includes a digital controller and a network processing unit and a WiFi radio service unit (wRSU) which includes a WiFi radio and an antenna unit are independently separated from each other and are connected to each other by a cable.

The DNCU and the wRSU are connected to each other by at least one of an IEEE 802.3 protocol and a peripheral component interconnect (PCI) protocol. The DNCU and the wRSU are connected to each other by at least one selected from an optical cable, a coaxial cable, and a LAN cable.

At least one selected from a WiFi driver, an operating system (OS), TCP/IP, and an application program is installed on the DNCU, and a WiFi firmware (F/W) and a program for interface with the DNCU are installed on the wRSU. The DNCU includes a wRSU interface unit for physical connection with the wRSU, a low latency network switch and control process unit for low latency and control of data upon communication with the wRSU and an upper network, and a packet core network interface unit for transmitting data to the upper network.

The wRSU interface unit includes: a first transceiver for communicating with the wRSU; and a first physical interface (PHY) for connecting the first transceiver to the low latency network switch and control process unit. Fabric capacity of the low latency network switch and control process unit is greater than the sum of interface capacities of wRSUs and the sum of processing capacities of the packet core network interface unit.

The packet core network interface unit includes: a second transceiver for communicating with the upper network; and a second PHY for connecting the second transceiver to the low latency network switch and control process unit. The wRSU includes: an RF unit for processing a radio signal communicating with an upper network; and a PHY unit for transmitting signals modulated and demodulated by the RF unit to the DNCU.

The PHY unit is divided into an IEEE 802.3 PHY unit which uses an IEEE 802.3 standard and a PCI PHY unit which uses a PCI standard. The RF unit includes: a front end module embedded with an amplifier and a filter; a transceiving RF module for transceiving a signal through the antenna unit; and a baseband modem for converting an analog signal transmitted from the transceiving RF module into a digital signal and transmitting the digital signal to a PHY unit, and converting a digital signal input from the PHY unit into an analog signal and transmitting the analog signal to the transceiving RF module.

The DNCU and the wRSU are physically connected to each other according to at least one selected from a PHY to PHY method using IEEE 802.3 PHY, a PHY to MAC method using IEEE 802.3 PHY and IEEE 802.3 MAC, a MAC to MAC method using IEEE 802.3 MAC, and a PCI to PCI method using a PCI protocol including a PCIe standard.

DETAILED DESCRIPTION OF EMBODIMENTS

Figure 1:
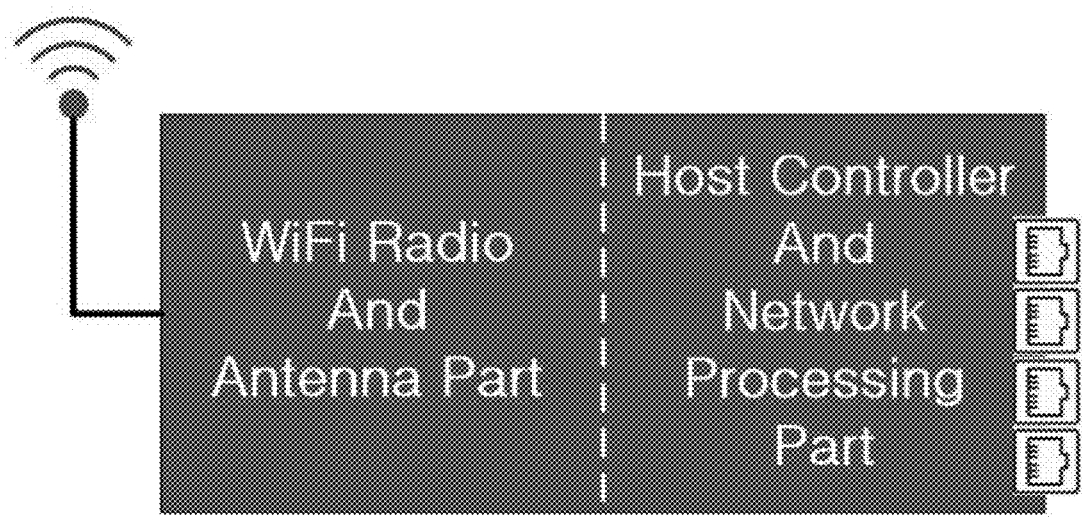
FIG. 1 is diagram schematically illustrating a general configuration of a conventional WiFi AP device.

In the following description, terms or words used in the specification and the claims are construed as not typical or lexical meaning, but meaning and concept corresponding to the idea of the present invention on the principle that the inventor can properly define the concept of the terms in order to explain his/her own invention for the best.

Therefore, it should be understood that various equivalents and alternatives can be made at the time of filing the present invention since the descriptions of the specification and the features shown in the drawings are no other than preferred embodiments without reflecting all the technical ideas of the present invention.

Hereinafter, a WiFi network system for an highly dense network environment according to the present invention will be described with reference to the accompanying drawing.

FIG. 1 is diagram schematically illustrating a general configuration of a conventional WiFi AP device.

FIG. 1 illustrates a configuration of a general WiFi access point (AP). Currently, most commercially available WiFi APs include all layers of the OSI 7 layers or TCP/IP. This is quite different from a configuration in which the operations of other network devices that provide data services are implemented according to layer-by-layer functions. Due to this, a software configuration and a hardware configuration are complicated. However, the price of radio subscriber devices is gradually lowered due to the characteristics of the radio subscriber devices which are intensely competitive in the markets. In terms of operators, outdoor services of WiFi devices are gradually increased, but the current WiFi AP has a structure that is not easy in radio site expansion and installation.

Figure 2:
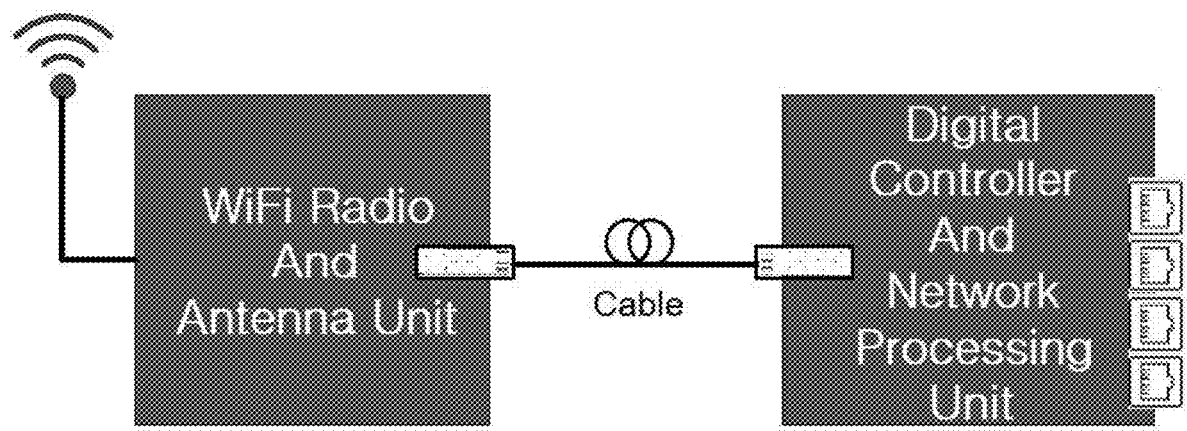
FIG. 2 is a diagram schematically illustrating a hardware configuration of a WiFi network system for an highly dense network environment according to the present invention.
Figure 3:
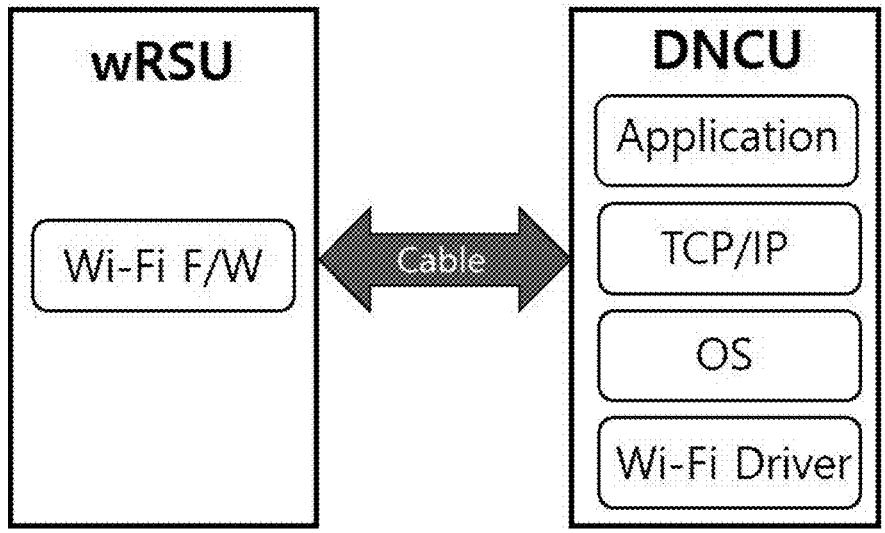
FIG. 3 is a diagram schematically illustrating a software configuration of a WiFi network system for an highly dense network environment according to the present invention.

FIG. 2 is a diagram schematically illustrating a hardware configuration of a WiFi network system for an highly dense network environment according to the present invention, and FIG. 3 is a diagram schematically illustrating a software configuration of the WiFi network system for the highly dense network environment according to the present invention.

The present invention basically includes a digital networking & control unit (DNCU) and a WiFi radio service unit (wRSU) which are separated from each other.

More specifically, in the present invention, the DNCU which includes a digital controller and a network processing unit and the wRSU which includes a WiFi radio and an antenna unit are independently separated from each other and are connected to each other by a cable.

That is, the existing WiFi AP provides services in a state of being divided into the DNCU which manages channel processing and control and the wRSU which include an antenna, an up/down converter, a filter, an RF amplifier, an RF transceiver, and a baseband modem. The DNCU and the wRSU are connected by wired lines such as optical cables, coaxial cables, or LAN cables which follow the IEEE 802.3 protocol and the Peripheral Component Interconnect (PCI) protocol, which are widely used for scalability and compatibility, and can transmit signals at high speed.

A connection scheme between the DNCU and the wRSU follows the Universal WiFi Ethernet Interface (UWEI) protocol proposed later. In terms of software, the wRSU includes WiFi firmware (F/W) and a program for interface with the DNCU, and the DNCU has a structure in which a WiFi driver, an operating system (OS), TCP/IP, and various applications are mounted.

Figure 4:
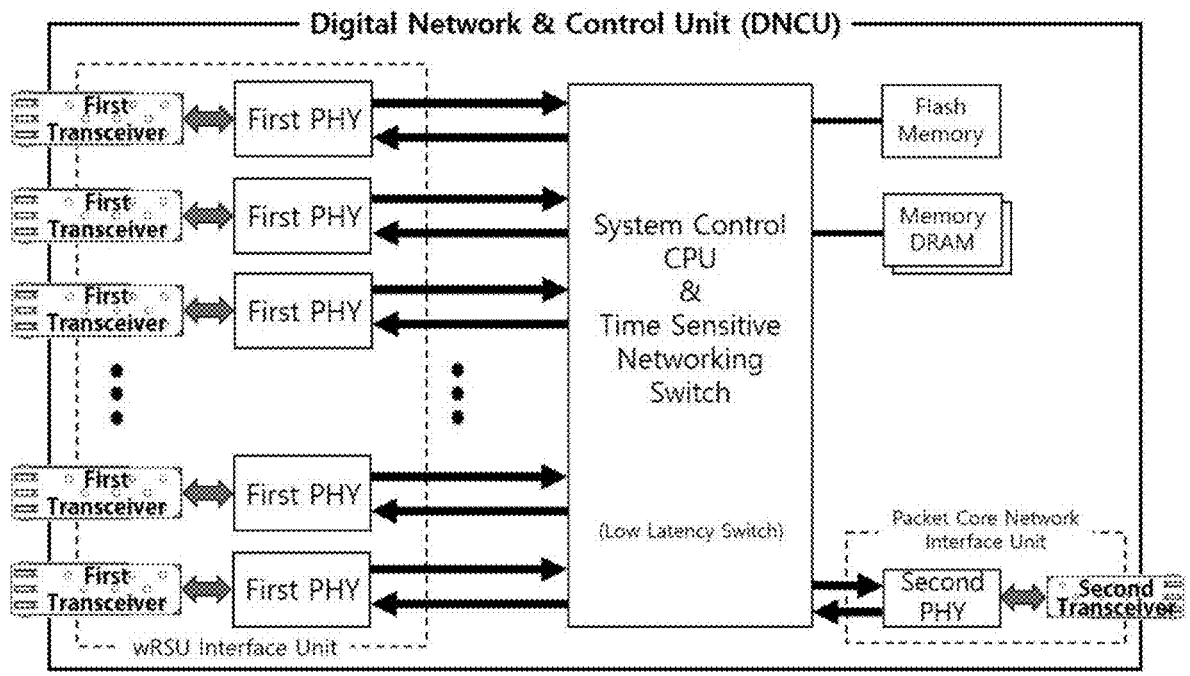
FIG. 4 is a block diagram illustrating a hardware configuration of a DNCU in a WiFi network system for an highly dense network environment according to the present invention.
Figure 5:
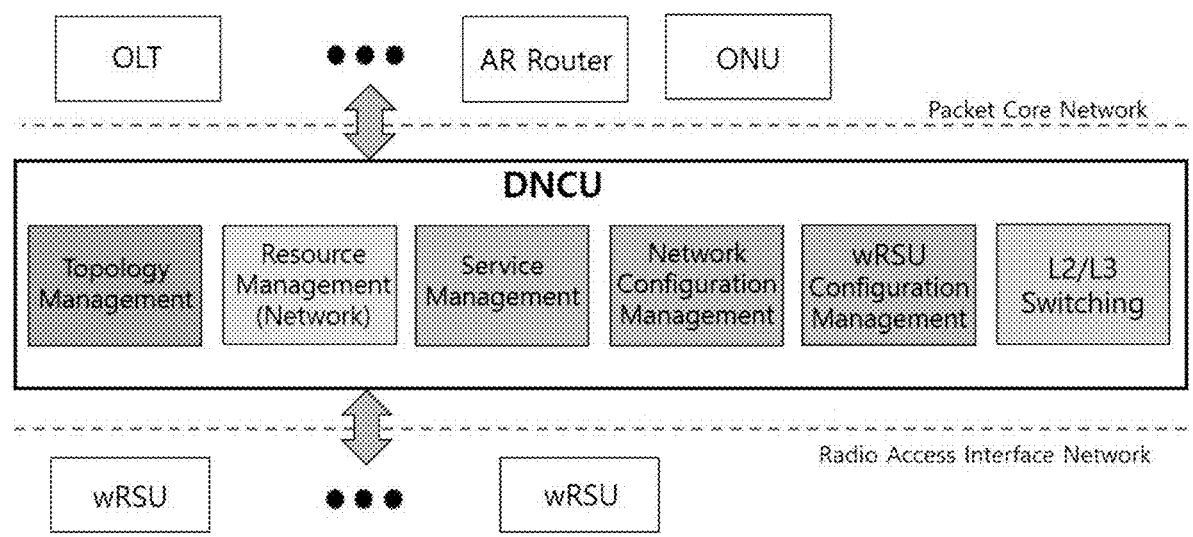
FIG. 5 is a block diagram illustrating a functional implementation of a DNCU in a WiFi network system for an highly dense network environment according to the present invention.

FIG. 4 is a block diagram illustrating the hardware configuration of the DNCU in the WiFi network system for the highly dense network environment according to the present invention, and FIG. 5 is a block diagram illustrating the functional implementation of the DNCU in the WiFi network system for the highly dense network environment according to the present invention.

The DNCU includes a wRSU interface unit for physical connection with the wRSU, a low latency network switch and control process unit (system control CPU & time sensitive networking switch) for low latency and control of data upon communication with the wRSU and the upper network, and a packet core network interface unit for transmitting data to the upper network. One DNCU aggregates and controls a plurality of wRSUs and transmits data to the upper packet core network interface unit through the low latency network switch and control process unit.

The wRSU interface unit includes a first transceiver for communicating with the wRSU, and a first physical interface (PHY) for connecting the first transceiver to the low latency network switch and control process unit.

The low latency network switch and control process unit separates a control signal and a data signal from a signal transmitted from the wRSU. The data signal is processed by the low latency network switch and control process unit and is then transmitted to the upper network. The fabric capacity of the low latency network switch and control process unit is greater than the sum of the interface capacities of the wRSUs and the sum of the processing capacities of the packet core network interface unit.

The packet core network interface unit aggregates data from the wRSUs and transmits data processed by the low latency network switch and control process unit to the upper packet core network. To this end, the packet core network interface unit includes a second transceiver for communicating with the upper network, and a second PHY for connecting the second transceiver to the low latency network switch and control process unit.

The function of the DNCU includes topology management, network resource management, service management, network configuration management, wRSU configuration and operation management, L2/L3 low latency switching, and the like.

Figure 6:
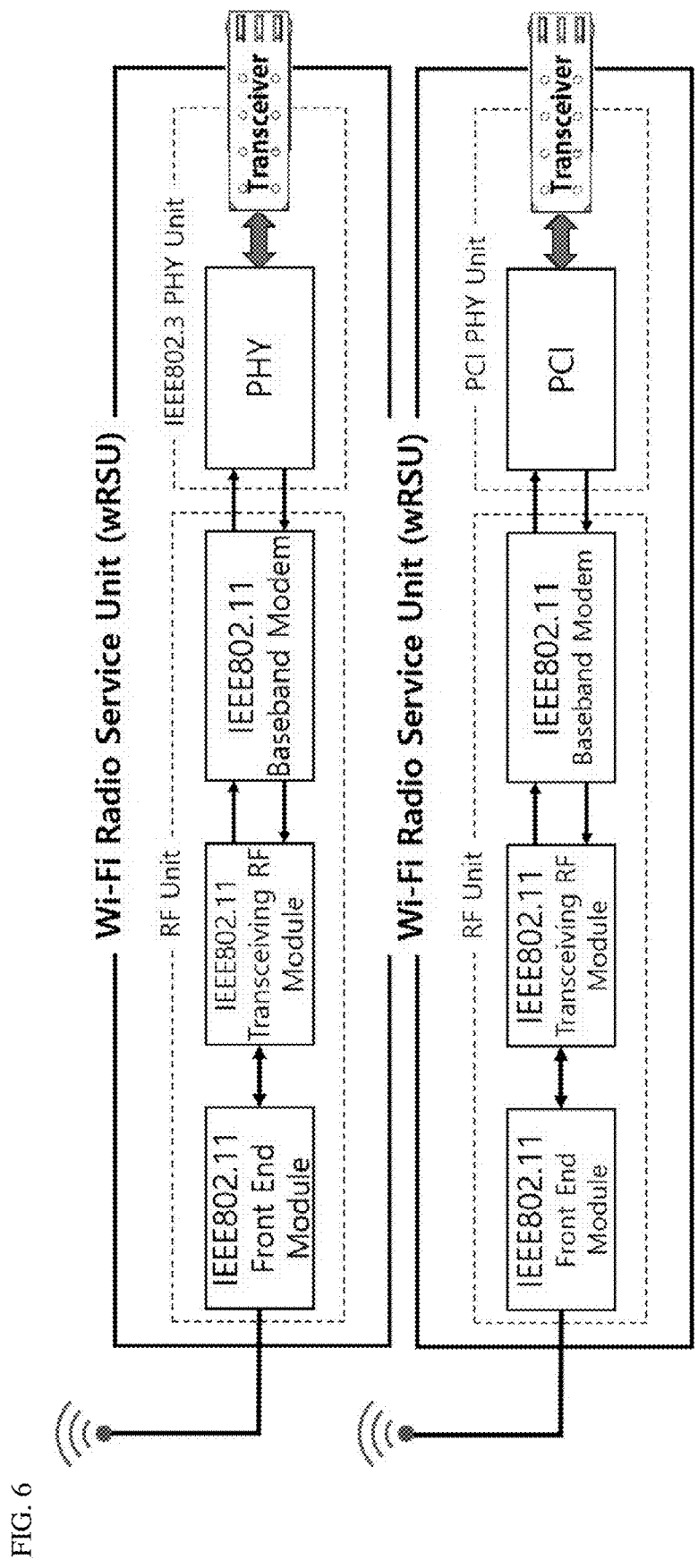
FIG. 6 is a block diagram illustrating a functional implementation of a wRSU in a WiFi network system for an highly dense network environment according to the present invention.

FIG. 6 is a block diagram illustrating the functional implementation of the wRSU in the WiFi network system for the highly dense network environment according to the present invention.

The wRSU includes an RF unit for processing a radio signal communicating with the upper network and a PHY unit for transmitting signals modulated and demodulated by the RF unit to the DNCU. In other words, the wRSU includes the RF unit and the PHY unit for transmitting signals modulated and demodulated by the RF unit to the DNCU.

The PHY unit may be divided into an IEEE 802.3 PHY unit which uses the IEEE 802.3 standard and a PCI PHY unit which uses the PCI standard.

The RF unit includes a front end module embedded with an amplifier and a filter, a transceiving RF module for transceiving signals through an antenna unit, and a baseband modem for converting an analog signal transmitted from the transceiving RF module into a digital signal and transmitting the digital signal to the PHY unit, and converting a digital signal input from the PHY unit into an analog signal and transmitting the analog signal to the transceiving RF module.

The transceiving RF module is electrically connected to the baseband modem inside the wRSU, transmits a data signal received through the antenna unit to the baseband modem, and transmits data received from the DNCU to the outside through the antenna unit.

In the case of the analog signal among the signals input from the transceiving RF module, the baseband modem converts the analog signal into the digital signal in the analog/digital conversion unit and transmits the digital signal to the PHY unit. The baseband modem converts the digital signal input from the PHY unit into the analog signal in the digital/analog conversion unit and transmits the analog signal to the transceiving RF module. The signal received from the baseband modem is transmitted to the DNCU through the transceiver and the PHY of the PHY unit.

In addition, the wRSU which uses the PHY unit by applying the PCI standard processes the transceived radio signal in the RF unit and transmits the processed radio signal to the PCI PHY unit. The analog signal among the signals input from the RF unit is converted into the digital signal in the baseband modem which is the analog/digital conversion unit, and the digital signal is transmitted to the PCI PHY. The digital signal input from the PCI PHY is converted into the analog signal in the baseband modem which is the digital/analog conversion unit, and the analog signal is transmitted to the receiving RF module. The transceived signal received from the baseband modem is transmitted to the DNCU through the transceiver and the PCI of the PCI PHY unit FIG. 7 is a diagram illustrating the physical interface method for connection of the DNCU and the wRSU in the WiFi network system for the highly dense network environment according to the present invention.

Figure 7:
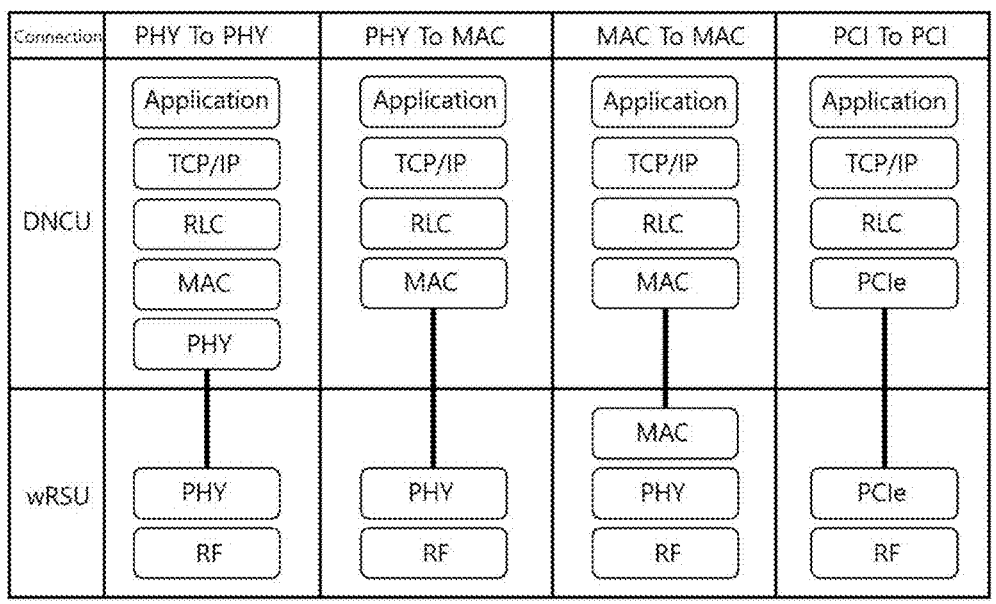
FIG. 7 is a diagram illustrating a physical interface method for connection of a DNCU and a wRSU in a WiFi network system for an highly dense network environment according to the present invention.

Referring to FIG. 7, as the physical interface connection method for the connection of the wRSU and the DNCU, Universal WiFi Ethernet Interface (UWEI) following the IEEE 802.3 protocol is proposed. Since the functions of the wRSU and the DNCU are physically separated, four UWEI protocols for physically connecting the two devices and enabling communication are defined as follows.

First, a method for connecting PHY to PHY by using IEEE 802.3 PHY has a large transmission data capacity, but enables low latency transmission and can be implemented at the lowest cost.

Second, a method for connecting PHY to MAC by using IEEE 802.3 PHY and IEEE 802.3 MAC has a small transmission data capacity, but causes a slight latency as compared with the PHY to PHY connection.

Third, a method for connecting MAC to MAC by using IEEE 802.3 MAC has a small transmission data capacity and causes a slight latency as compared with the PHY to PHY connection, but has the best compatibility with other devices and can be easily implemented.

Finally, a method for connecting PCI to PCI following PCI and PCIe which are the connection standard between computer devices has the largest transmission data capacity and the lowest data transmission latency rate, but cannot enable long-distance transmission. Thus, this method can be applied only when two devices are installed at a short distance.

The DNCU includes a PCI layer or a MAC layer, a radio link control (RLC) layer, a TCP/IP layer, a common layer of an application layer, regardless of how the UWEI is implemented.

Figure 8:
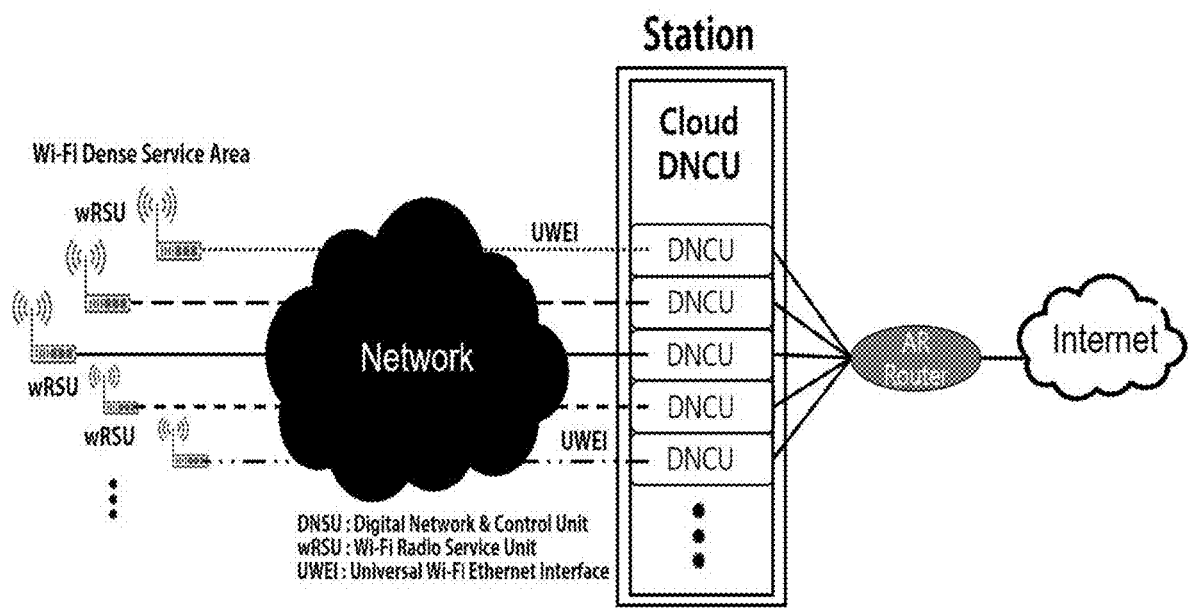
FIG. 8 is a diagram illustrating a network constructed through a WiFi network system for an highly dense network environment according to the present invention.

FIG. 8 is a diagram illustrating a network constructed through the WiFi network system for the highly dense network environment according to the present invention.

Referring to FIG. 8, wRSUs are installed at a remote place for providing a service, and DNCUs are installed at a station in the cloud form. These devices are connected to each other via a UWEI interface.

Since the DNCUs are arranged at the station in the cloud form, wRSU can be additionally installed at a remote place without additional setting, and the cloud DNCU accommodates a plurality of wRSUs so that control information between the cloud DNCUs can be shared. Therefore, interference can be removed through the efficient management of radio resources and a soft handover service can be provided.

In addition, since the WiFi device is divided into the DNCU and the wRSU and the digital processing functions are concentrated on one place, the WiFi device can be supplied at low cost, and the currently increasing traffic can be processed by a higher speed network process. First of all, the efficiency of the DNCU can be improved.

In addition, the increase in the capacity of the WiFi AP can be obtained by additionally installing only the relatively inexpensive wRSU. This combination will enable a new WiFi radio access network that can quickly expand while providing an optimal WiFi service at low cost in a dense environment.

As described above, in the WiFi network system for the highly dense network environment according to the present invention, the DNCU and the wRSU are separated from each other. The wRSU is a device that transceives signals to/from a terminal by using a radio frequency and serves as a repeater in a service site. The DNCU is a base station equipment that converts a radio signal transmitted from the wRSU through the cable into a packet and transmits the packet to the L2/L3 aggregation switch or the upper device. The DNCU can be installed to concentrated on the operating station.

Upon installation in the conventional WiFi APs whose size and power consumption are increasing due to the introduction of high-capacity data processing and MIMO technology, it is possible to reduce the usage of electricity and the utilization of space, and thus it is possible to reduce the operating cost of the communication company after constructing public WiFi and indoor/outdoor WiFi facilities.

By concentrating DNCU processing functions in one place in the existing device, the WiFi AP price can be lowered, and the network processing functions are concentrated in one place, thereby improving management efficiency and maintenance convenience.

In addition, since it is separated by hardware, the structure becomes simple as compared with the existing WiFi AP, and the failure rate of equipment is also lowered.

In addition, since only a relatively inexpensive wRSU is installed, the capacity increase effect of the WiFi AP can be obtained.

While the present invention has been particularly shown and described with reference to exemplary embodiments thereof, the present invention is not limited to the specific exemplary embodiments. It will be understood by those of ordinary skill in the art that various modifications may be made thereto without departing from the spirit and scope of the present invention as defined by the appended claims, and such modifications fall within the scope of the claims.

What is claimed is:

1. A WiFi network system for a highly dense network environment characterized in that a digital networking and control unit (DNCU), which comprises a digital controller and a network processing unit, and a WiFi radio service unit (wRSU), which comprises a WiFi radio and an antenna unit, are independently separated from each other and are connected to each other by a cable,
wherein the DNCU comprises a wRSU interface unit configured to provide physical connection with the wRSU, a low latency network switch and control process unit configured to provide low latency and control of data upon communication with the wRSU and an upper network, and a packet core network interface unit configured to transmit data to the upper network.

2. The WiFi network system of claim 1, wherein the DNCU and the wRSU are connected to each other by at least one of an IEEE 802.3 protocol and a peripheral component interconnect (PCI) protocol.

3. The WiFi network system of claim 1, wherein the DNCU and the wRSU are connected to each other by at least one selected from an optical cable, a coaxial cable, and a LAN cable.

4. The WiFi network system of claim 1, wherein at least one selected from a WiFi driver, an operating system (OS), TCP/IP, and an application program is installed on the DNCU, and a WiFi firmware (F/W) and a program for interface with the DNCU are installed on the wRSU.

5. The WiFi network system of claim 1, wherein the wRSU interface unit comprises:
a first transceiver configured to communicate with the wRSU; and
a first physical interface (PHY) configured to connect the first transceiver to the low latency network switch and control process unit.

6. The WiFi network system of claim 1, wherein fabric capacity of the low latency network switch and control process unit is greater than a sum of interface capacities of wRSUs and a sum of processing capacities of the packet core network interface unit.

7. The WiFi network system of claim 1, wherein the packet core network interface unit comprises:
a second transceiver configured to communicate with the upper network; and
a second PHY configured to connect the second transceiver to the low latency network switch and control process unit.

8. A WiFi network system for a highly dense network environment characterized in that a digital networking and control unit (DNCU), which comprises a digital controller and a network processing unit, and a WiFi radio service unit (wRSU), which comprises a WiFi radio and an antenna unit, are independently separated from each other and are connected to each other by a cable,
wherein the wRSU comprises:
an RF unit configured to process a radio signal communicating with an upper network; and
a physical interface (PHY) unit configured to transmit signals modulated and demodulated by the RF unit to the DNCU.

9. The WiFi network system of claim 8, wherein the PHY unit is divided into an IEEE 802.3 PHY unit which uses an IEEE 802.3 standard and a PCI PHY unit which uses a peripheral component interconnect (PCI) standard.

10. The WiFi network system of claim 8, wherein the RF unit comprises:
a front end module embedded with an amplifier and a filter;
a transceiving RF module configured to transceive a signal through the antenna unit; and
a baseband modem configured to convert an analog signal transmitted from the transceiving RF module into a digital signal and transmitting the digital signal to the PHY unit, and converting a digital signal input from the PHY unit into an analog signal and transmitting the analog signal to the transceiving RF module.

11. The WiFi network system of claim 9, wherein the RF unit comprises:
a front end module embedded with an amplifier and a filter;
a transceiving RF module configured to transceive a signal through the antenna unit; and
a baseband modem configured to convert an analog signal transmitted from the transceiving RF module into a digital signal and transmitting the digital signal to the PHY unit, and converting a digital signal input from the PHY unit into an analog signal and transmitting the analog signal to the transceiving RF module.

12. A WiFi network system for a highly dense network environment characterized in that a digital networking and control unit (DNCU) which comprises a digital controller and a network processing unit and a WiFi radio service unit (wRSU) which comprises a WiFi radio and an antenna unit are independently separated from each other and are connected to each other by a cable, wherein the DNCU and the wRSU are physically connected to each other according to at least one selected from a physical interface (PHY) to PHY method using IEEE 802.3 PHY, a PHY to MAC method using the IEEE 802.3 PHY and IEEE 802.3 MAC, a MAC to MAC method using the IEEE 802.3 MAC, and a PCI to PCI method using a peripheral component interconnect (PC) protocol including a PCIe standard.

\* \* \* \* \*